June 23, 1925.
J. H. BLOODGOOD
COMBINATION SAW
Filed Nov. 20, 1923
1,543,051
2 Sheets-Sheet 1
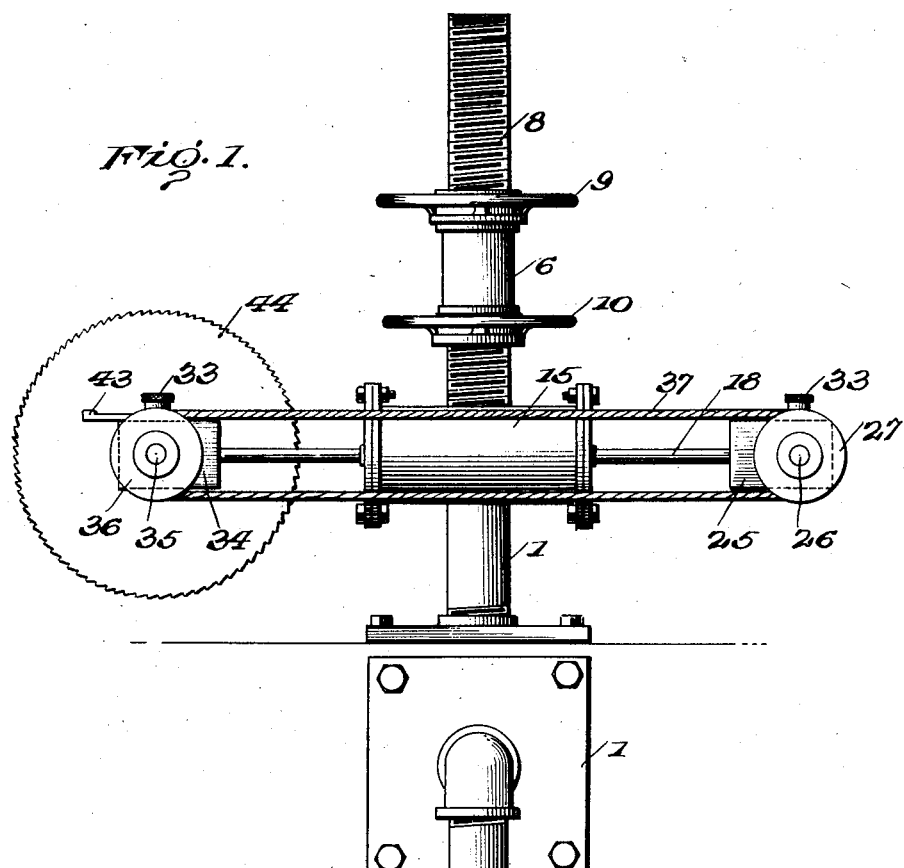
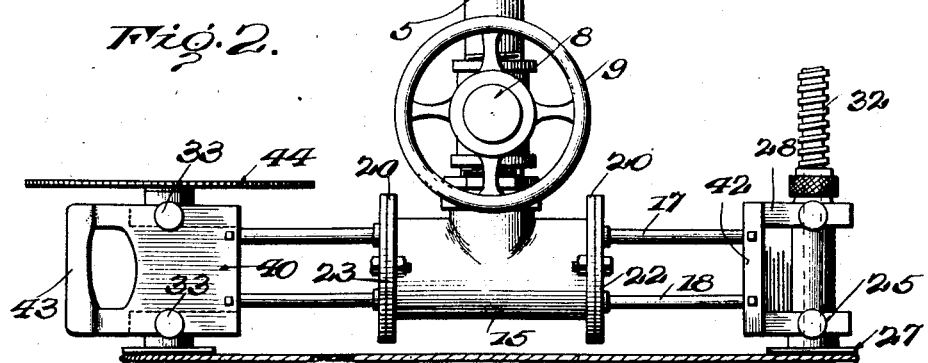
WITNESSES
INVENTOR
J. H. Bloodgood,
BY
ATTORNEYS

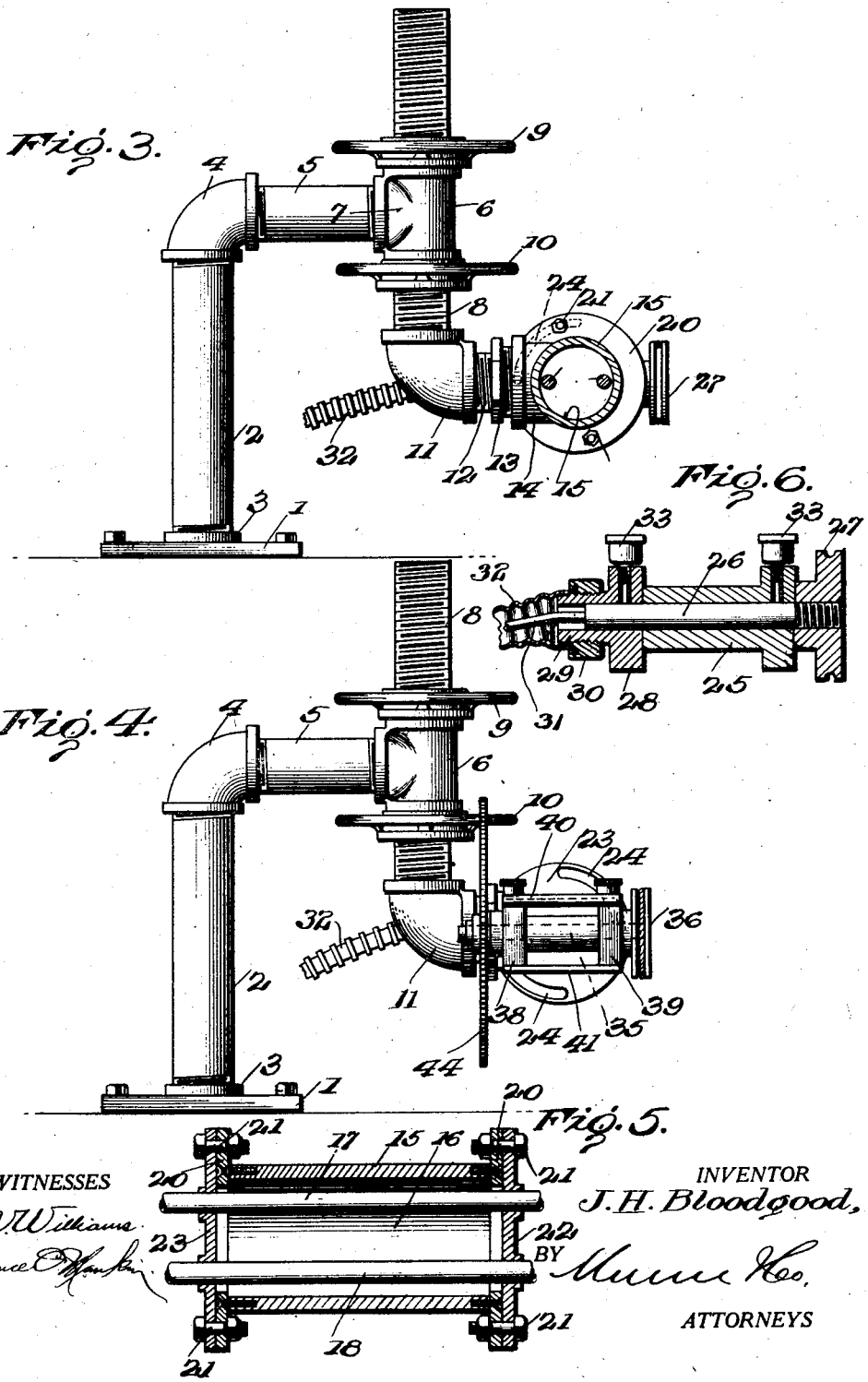

Patented June 23, 1925.

1,543,051

UNITED STATES PATENT OFFICE.

JAMES H. BLOODGOOD, OF TAMPA, FLORIDA.

COMBINATION SAW.

Application filed November 20, 1923. Serial No. 675,903.

*To all whom it may concern:*

Be it known that I, JAMES H. BLOODGOOD, a citizen of the United States, and a resident of Tampa, in the county of Hillsboro and State of Florida, have invented certain new and useful Improvements in Combination Saws, of which the following is a specification.

This invention relates to portable saws and has for its object the provision of a device which may be adjusted in a plurality of positions whereby the saw may be employed as a cross cut, rip or double miter saw, or the device may be used as a single miter saw. When employed as a miter saw whether single or double, any angle from 0° to 90° may be cut.

A further object of the invention is the provision of a compact, rugged, and efficient device which may be readily transported to an effective position for applying the saw to all kinds of wood cutting.

This invention will be best understood from a consideration of the following detailed description, in view of the accompanying drawing forming a part of the specification; nevertheless it is to be understood that the invention is not confined to the disclosure, being susceptible of such changes and modifications, which shall define no material departure from the salient features of the invention as expressed in the appended claims.

Figure 1 is a longitudinal front view of the portable saw,

Figure 2 is a plan view of the same,

Figure 3 is an end view f the device partly in section,

Figure 4 is an end view of the portable saw,

Figure 5 is a fragmentary sectional view showing an enlarged detail of the saw head support, Figure 6 is a transverse vertical section of the shaft and bearings of a driven pulley.

Referring more particularly to the drawings 1 designates a base plate which is adapted to be secured in position on a bench or other suitable support proximate the work to be cut.

Veritical standard or post 2 is screwed in a centrally disposed and internally boss 3. An elbow 4 rigidly connects a horizontal tubular member 5 with the post 2.

A hollow tee 6 having a smooth central bore is screwed on to the outer end of member 5 through the internally threaded extension 7 which projects laterally from said tee.

A threaded rod 8 is slidably mounted in the hollow bore of the tee and is adjusted and supported at various elevations by hand wheels 9 and 10 which have threaded engagement with the rod 8. By loosening hand wheel 9 and tightening wheel 10 said rod is elevated. The reverse rotations of the wheels lowers the rod.

An elbow 11 is screwed on to the lower end of rod 8. A threaded rod 12 screwed into the other end of said elbow carries at its outer end a thread nipple 13 which is screwed into an internally threaded lateral extension 14 forming part of a tee 15.

The body of the tee 15 is hollow as shown at 16 through which are inserted rods 17 and 18. Said rods pass through rings 19 and 20 secured to the opposite ends of the tee by screws. The rings project beyond the body and are provided with perforations in which are mounted adjusting bolts 21.

The rods 17 and 18 are supported in position by disks 22 and 23, which are provided with spaced perforations through which the rods are inserted. The metal disks surrounding these perforations are reinforced by bosses. Arcuately shaped slots 24 are cut concentrically in said disks through which the bolts 21 pass.

A bearing block 25 is secured to the adjacent ends of the rods 17 and 18. A shaft 26 carrying a driving pulley 27 for the shaft at one end is mounted for rotation in the block. A flanged member 28 completing the bearing for the shaft and supported by the rods has a threaded end 29 upon which is screwed a nut 30. A reduced end 31 of the shaft is located in a central bore of the end 29 and is adapted to be secured to a flexible driving shaft 32 which is connected to a suitable source of power remotely located from the portable saw.

Oil cups 33 are mounted on the bearing blocks 25 and 28 for lubricating the shaft 26.

On the forward ends of the rods 17 and 18 is mounted a saw head 34 carrying a shaft 35 and a pulley 36 for driving said shaft. A belt 37 connects pulleys 27 and 36 for simultaneous operation.

Bearing blocks 38 and 39 are secured together by means of plates 40 and 41. Straps 42 similarly secure bearing blocks 25 and 28 together.

A hand grip 43 is formed on the outer end of plate 40 whereby the saw head may be moved into the work.

A circular saw 44 is secured to a projecting end of shaft 35 and rotated by said shaft.

Oil cups 33 are also applied to the saw head for lubricating the shaft 35.

By the cooperative adjustment of the wheels 9 and 10 the rod 8 may be elevated or lowered thereby elevating or lowering the saw head, and the rod may be rotated whereby the saw head may be swung around in a horizontal plane, carrying the saw through a plurality of various positions for better adaptation of the saw to all kinds of work.

The circular saw 44 may be moved through an arc of a circle depending upon the length of the arcuately shaped slots 24 cut in the disks 22 and 23 by loosening the bolts 21 and rotating said disks. After the proper angular adjustment of the saw is had the bolts are then tightened and the saw is set for operation on the work.

When the power has been applied the saw is moved into the work for advancing the cutting by drawing on the hand grip 43, whereby the rods 17 and 18 will slide in their bearing comprising the bossed perforations in the disks 22 and 23.

It will be seen that by the various adjustments any number of cuts may be obtained with my saw from cross cuts to and through double mitering and any angle of cut may be had.

I claim:—

1. A portable saw comprising a vertical standard adapted to be secured in position, a horizontal arm projecting from said standard, a guide on the end of the arm, a slidable screw mounted for rotary and vertical adjustment in the guide, means supporting the screw and controlling the adjustment of the screw in the guide, a saw head support carried in a horizontal position by the screw, said support being composed of a tubular member, disks mounted for limited rotation on the opposite ends of the body, and rods slidably carried by said disk, passing through the tubular body and projecting from opposite ends of the body, a saw head rigidly connected to the adjacent ends of the rods, a shaft carrying a saw mounted for rotation in the saw head, a rotatable means on the opposite ends of the rods, and means operably connecting the rotatable means with the shaft in the saw head.

2. In a device of the class described the combination of a standard adapted to be secured in position and a saw head support swingably mounted in a horizontal plane on the standard and comprising a tubular member, disks mounted for limited rotation on the opposite ends of the body, and rods slidably carried by said disks, passing through the tubular body and projecting from opposite ends of the body, a saw head rigidly connected to the adjacent ends of the rods, a shaft carrying a saw mounted for rotation in the saw head, a pulley on the opposite end of the rods, and means operably connecting the rotatable means with the shaft in the saw head.

3. A portable saw comprising a standard adapted to be secured in a fixed position, a horizontal arm secured to the standard, a tee having a hollow body portion secured in vertical position to the arm, a screw slidably mounted in the hollow body, hand wheels located upon opposite ends of the hollow body and having threaded engagement with the screw for vertically adjusting the screw and permitting rotation of the screw, a saw head support slidably carried by the screw in a horizontal position, and means for permitting axial rotation of said support.

JAMES H. BLOODGOOD.